US006811401B1

United States Patent
Cruickshank

(12)
(10) Patent No.: US 6,811,401 B1
(45) Date of Patent: Nov. 2, 2004

(54) BINARY ROTATION TEACHING GAME

(76) Inventor: Christopher J. Cruickshank, 219 Avenue d'Huart, 1950 Kraainem Belgium (GB)

( * ) Notice: Subject to any disclaimer, the term of this patent is extended or adjusted under 35 U.S.C. 154(b) by 0 days.

(21) Appl. No.: 10/656,445

(22) Filed: Sep. 8, 2003

(51) Int. Cl.[7] .............................................. G09B 19/02
(52) U.S. Cl. .......................... 434/189; 434/201; 235/68
(58) Field of Search ................................ 434/201, 189, 434/191, 188; 446/168, 169, 171, 173; 273/153 R, 454, 455; 235/68

(56) References Cited

U.S. PATENT DOCUMENTS

| | | | | |
|---|---|---|---|---|
| 3,006,082 A | * | 10/1961 | Libbey | ...................... 434/118 |
| 3,314,169 A | * | 4/1967 | Wold | .......................... 434/189 |
| 3,390,471 A | * | 7/1968 | Godfrey | .................... 434/118 |
| 3,403,459 A | * | 10/1968 | Divilbiss | ................... 434/118 |
| 3,663,021 A | | 5/1972 | Whippo | |
| 3,677,549 A | | 7/1972 | Moscovich | |
| 4,258,922 A | | 3/1981 | Landry | |
| 4,840,375 A | | 6/1989 | Lawlor et al. | |
| 5,016,879 A | | 5/1991 | Parker et al. | |
| 5,213,506 A | * | 5/1993 | Lapsa et al. | ................ 434/118 |
| 5,509,655 A | | 4/1996 | Ugawa | |
| 6,047,963 A | | 4/2000 | Pierce et al. | |

* cited by examiner

*Primary Examiner*—Derris H. Banks
*Assistant Examiner*—Bena B. Miller

(57) ABSTRACT

The game for teaching binary mathematics includes a plurality of balls, a backboard, and a plurality of elongate members selectively connected to each other and to the backboard in non-horizontal directions. A plurality of gate sections are pivotally connected to the backboard and engageable with select ones of the plurality of members so that the gate sections can be pivoted between open and closed positions respectively. Select ones of the plurality of balls may cause corresponding ones of the plurality of gate sections to pivot between open and closed positions after passing thereby. Corresponding 0 and 1 binary values are assigned to closed and open ones of the plurality of gate sections, respectively, so that a number of the plurality of marbles that have been introduced to the game can be determined by adding the corresponding 0 and 1 binary values.

7 Claims, 3 Drawing Sheets

BINARY ROTATION TEACHING GAME

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a teaching game and, more particularly, to a binary rotation teaching game including a plurality of marbles for toggling a plurality of gates between open and closed positions.

2. Prior Art

The binary system has become widely known and used during recent years in electronic data processing equipment. Emphasis has also been placed on the binary system in modern educational courses of mathematics, such as the so-called "new math". However, the binary system is not known to have been incorporated heretofore in game apparatus or sets for purposes of entertainment and enjoyment as well as being educational.

Moreover, computers play an ever-increasing role in the conduct of the affairs of virtually everyone in the country. The functions of digital computers are based upon logic and arithmetic operations which recognize two states, e.g., on-off, high-low, magnetized-non-magnetized. The two states are assigned respective meanings which relate to the operation being performed, e.g., true-false, 1–0, etc. While overall computer construction, operation and programming can be very complex and highly technical, the basics of binary mathematics and the various manipulations of the digit sequences which implement the logic and arithmetic operations may be learned by persons of all ages having basic numerical familiarity.

Presently known games based on numbers use the number system having base 10, such as conventional playing cards. This invention utilizes the binary number system having base 2 in games, which may be played with gates as long as each is able to display representations of 0 and 1, which comprise the numbers in the binary system.

BRIEF SUMMARY OF THE INVENTION

In view of the foregoing background, it is therefore an object of the present invention to provide a simple and enjoyable means for learning the basics of binary mathematics and typical computer operations. These and other objects, features, and advantages of the invention are provided by a game for learning binary mathematics and including a plurality of balls that may be formed from glass or steel material, a backboard having a substantially planar surface and opposed top and bottom edge portions integral therewith, and a plurality of elongate members selectively connected to each other and to the backboard. The plurality of members are disposed in non-horizontal directions and define a plurality of paths between the top and bottom edge portions of the backboard.

The game further includes a plurality of gate sections pivotally connected to the backboard and engageable with select ones of the plurality of members so that the gate sections can be pivoted between open and closed positions, respectively. The plurality of gate sections each has an axis of rotation preferably extending substantially perpendicularly to the backboard, respectively.

The game may further include a plurality of electrical contacts connected to the plurality of gate sections and the plurality of elongate members, a plurality of LEDs connected to one the plurality of electrical contacts, respectively, and a power supply source connected to another of the plurality of electrical contacts, respectively. Select ones of the plurality of marbles may cause corresponding ones of the plurality of gate sections to pivot between open and closed positions after passing thereby.

Corresponding 0 and 1 binary values are assigned to closed and open ones of the plurality of gate sections, respectively, so that a number of marbles that have been introduced to the game can be determined by adding the corresponding 0 and 1 binary values. The plurality of electrical contacts are caused to engage each other preferably when the plurality of gate sections are at closed positions and thereby cause the plurality of LEDs to illuminate, respectively. The plurality of gate sections each include a top surface that preferably becomes substantially aligned with a corresponding one of the plurality of elongate members when the plurality of gate sections are moved to a closed position so that the plurality of balls can pass thereover, respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
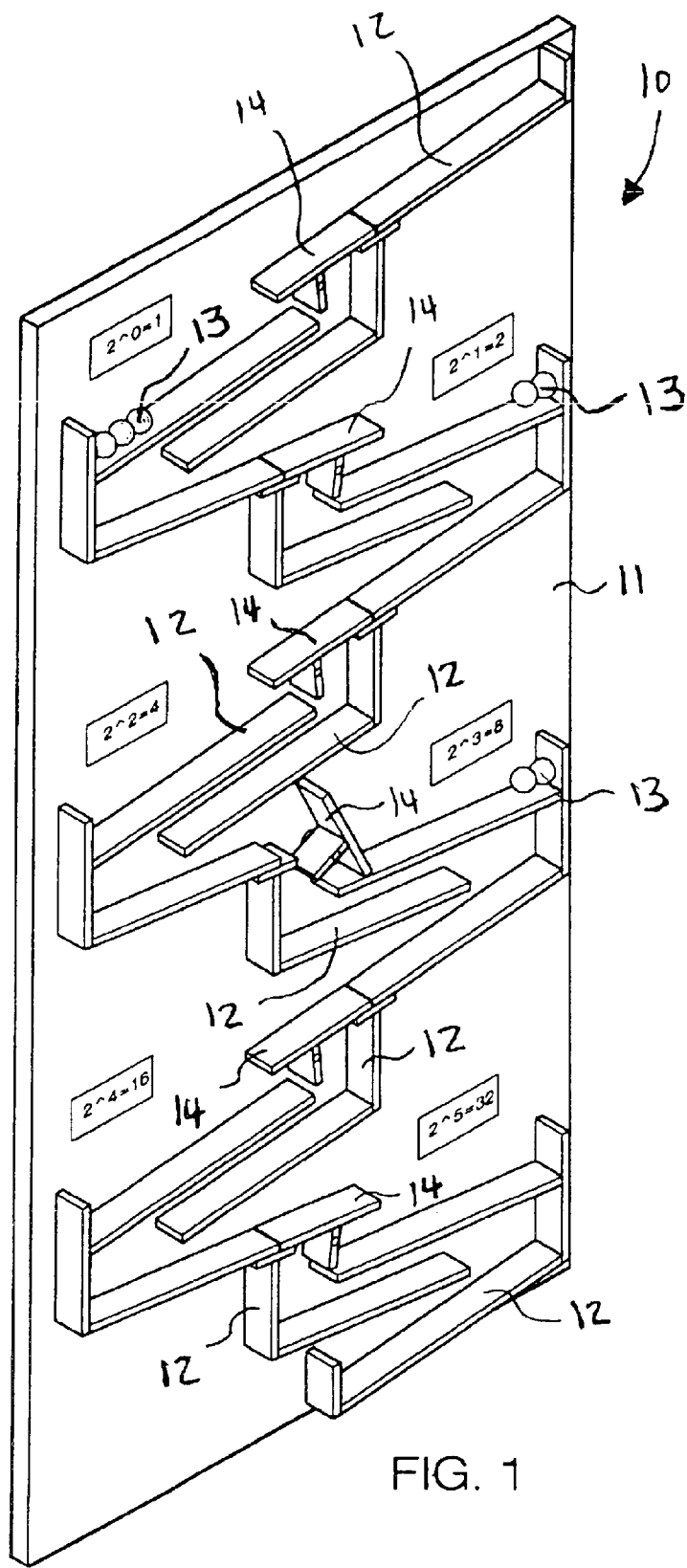
FIG. 1 is a perspective view showing a binary rotation teaching game, in accordance with the present invention.
Figure 2:
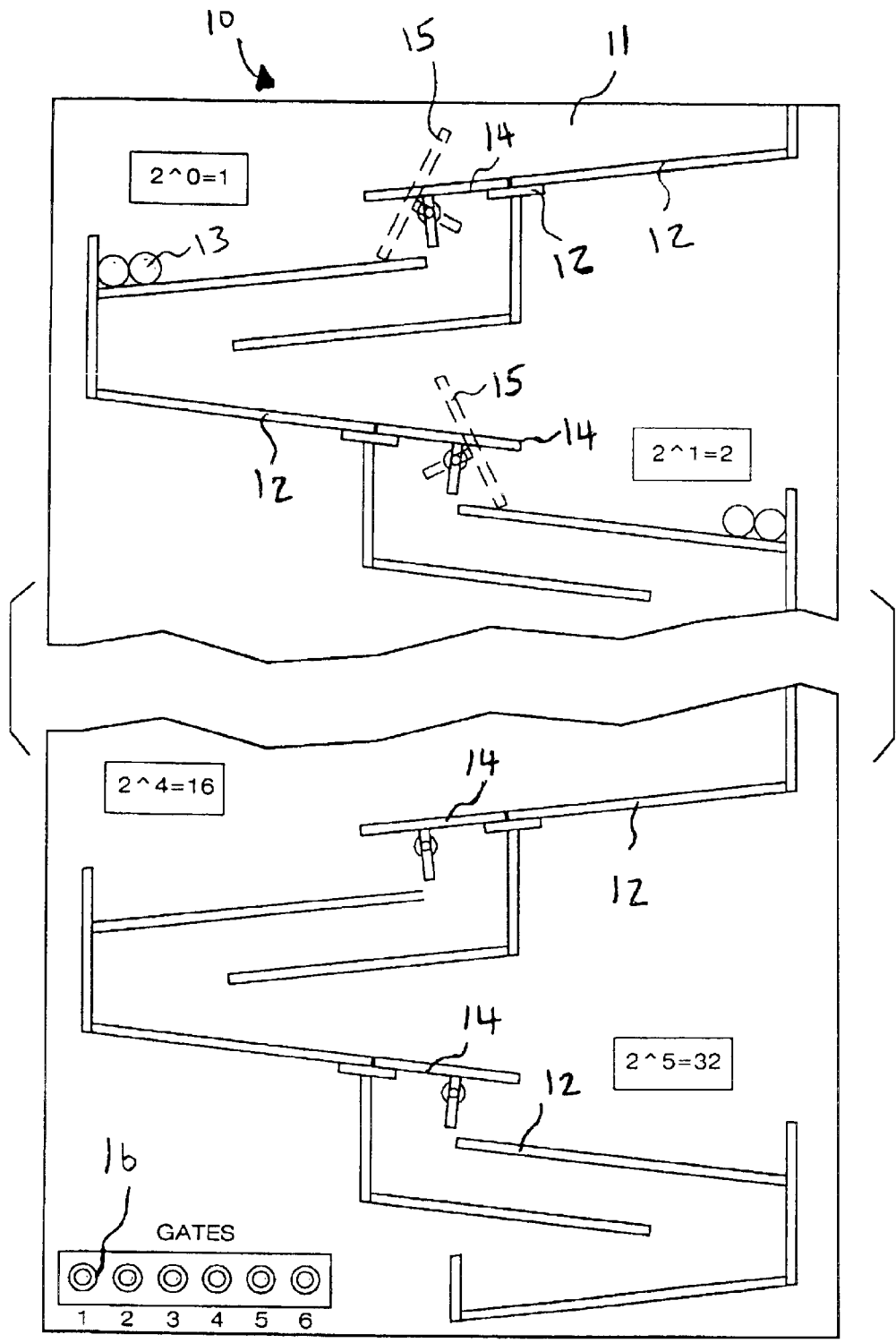
FIG. 2 is an enlarged front elevational view thereof.

The apparatus of this invention is referred to generally in FIGS. 1 and 2 by the reference numeral 10 and is intended to provide a simple and enjoyable means for learning the basics of binary mathematics and typical computer operations. It should be understood that the apparatus 10 may be used to teach binary mathematics as well as Boolean algebra and digital electronics, for example.

The apparatus 10 includes a plurality of balls 13 that may be formed from glass or steel material, a backboard 11 having a substantially planar surface and opposed top and bottom edge portions integral therewith, and a plurality of elongate members 12 selectively connected to each other and to the backboard 11. The plurality of members are disposed in non-horizontal directions and define a plurality of paths between the top and bottom edge portions of the backboard 11 so that the plurality of balls 13 can selectively travel downwardly from the top to the bottom edge portions of the backboard 11.

Figure 3:
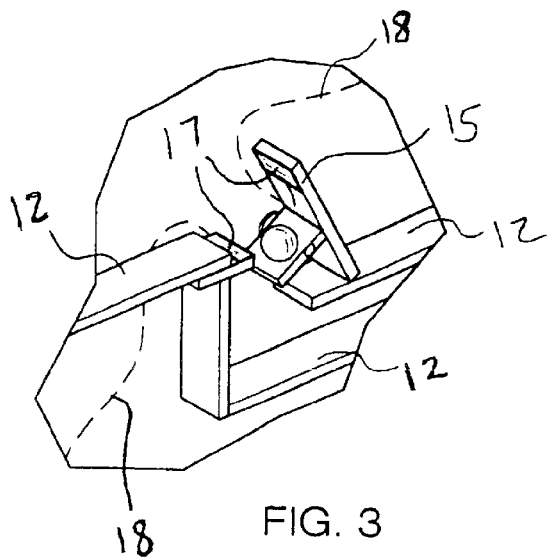
FIG. 3 is an enlarged perspective view of a gate section shown in FIG. 2.
Figure 4:
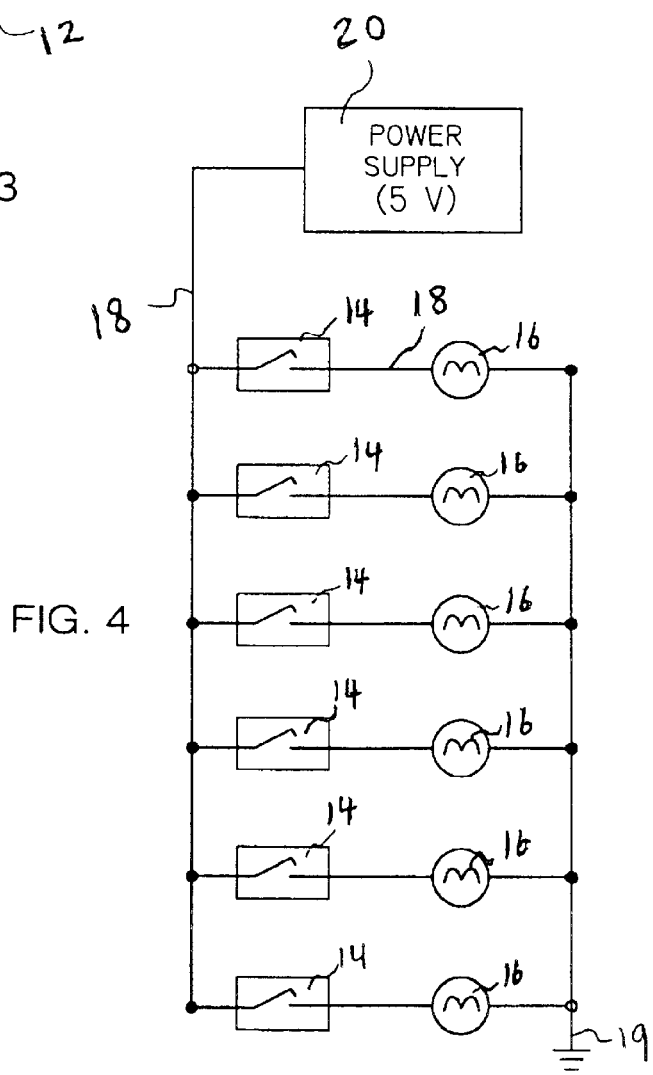
FIG. 4 is schematic diagram showing a plurality of LEDs operably connected to a plurality of corresponding gate sections and a power supply source, respectively.

The game 10 further includes a plurality of gate sections 14 pivotally connected to the backboard 11 via a conventional pin member and are engageable with select ones of the plurality of members 12 so that the plurality gate sections 14 can be pivoted between open 14 and closed 15 positions, respectively. The plurality of gate sections 14 each has an axis of rotation preferably extending substantially perpendicularly to the backboard 11, respectively, as perhaps best shown in FIG. 3.

The game 10 may further includes a plurality of electrical contacts 17 connected to the plurality of gate sections 14 and the plurality of elongate members 12, a plurality of LEDs 16 connected to one of the plurality of electrical contacts 17 via a conventional wire 18, respectively, and a power supply source 20 connected to another the plurality of electrical contacts via a conventional wire 18, respectively. Such LEDs 16 are grounded at 19. Select ones of the plurality of marbles 13 may cause corresponding ones of the plurality of gate sections 14 to pivot between open 14 and closed 30 positions 15 after passing thereby.

Corresponding 0 and 1 binary values are assigned to closed 15 and open 14 ones of the plurality of gate sections 14, respectively, so that a number of the plurality of marbles 13 that have been introduced to the game 10 can be determined by adding the corresponding 0 and 1 binary values. The plurality of electrical contacts 17 are caused to engage each other preferably when the plurality of gate sections 14 are at closed positions 15 to thereby cause the plurality of LEDs 16 to illuminate, respectively.

The plurality of gate sections 14 each include a top surface that preferably becomes substantially aligned with a corresponding one of the plurality of elongate members 12 when the plurality of gate sections 14 are moved to a closed position 15 so that the plurality of balls 13 can pass thereover, respectively.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A game for earning binary mathematics and comprising:

a plurality of balls;

a backboard having a substantially planar surface and opposed top and bottom edge portions integral therewith;

a plurality of elongate members selectively connected to each other and to said backboard, said plurality of members being disposed in non-horizontal directions and defining a plurality of paths between said top and bottom edge portions;

a plurality of gate sections pivotally connected to said backboard and engageable with select ones of said plurality of members so that said gate sections can be pivoted between open and closed positions respectively;

a plurality of electrical contacts connected to said plurality of gate sections and said plurality of elongate members;

a plurality of LEDs connected to one said plurality of electrical contacts respectively; and a power supply source connected to another said plurality of electrical contacts respectively;

select ones of said plurality of marbles causing corresponding ones of said plurality of gate sections to pivot between open and closed positions after passing thereby, corresponding 0 and 1 binary values being assigned to closed and open ones of said plurality of gate sections respectively so that a number of said plurality of balls that have been introduced to said game can be determined by adding the corresponding 0 and 1 binary values; said plurality of elthical contacts being caused to engage each other when said plurality of gate sections are at closed positions and thereby cause said plurality of LEDs to illuminate respectively.

2. The game of claim 1, wherein said plurality of gate sections each have an axis of rotation extending substantially perpendicularly to said backboard respectively.

3. The game of claim 1, wherein said plurality of gate sections each include a top surface that becomes substantially aligned with a corresponding one of said plurality of elongate members when said plurality of gate sections are moved to a closed position so that said plurality of balls can pass thereover respectively.

4. The game of claim 1, wherein said plurality of balls are formed from one of glass and steel materials.

5. A game for learning binary mathematics and comprising:

a plurality of balls:

a backboard having a substantially planar surface and opposed top and bottom edge portions integral therewith;

a plurality of elongate members selectively connected to each other and to said backboard, said plurality of members being disposed in non-horizontal directions and defining a plurality of paths between said top and bottom edge portions;

a plurality of gate sections pivotally connected to said backboard and engageable with select ones of said plurality of members so that said gate sections can be pivoted between open and closed positions respectively, said plurality of gate sections each have an axis of rotation extending substantially perpendicularly to said backboard respectively;

a plurality of electrical contacts connected to said plurality of gate sections and said plurality of elongate members;

a plurality of LEDs connected to one said plurality of electrical contacts respectively; and a power supply source connected to another said plurality of electrical contacts respectively;

select ones of said plurality of marbles causing corresponding ones of said plurality of gate sections to pivot between open and closed positions after passing thereby, corresponding 0 and 1 binary values being assigned to closed and open ones of said plurality of gate sections respectively so that a number of said plurality of balls that have been introduced to said game can be determined by adding the corresponding 0 and 1 binary values; said plurality of electrical contacts being caused to engage each other when said plurality of gate sections are at closed positions and thereby cause said plurality of LEDs to illuminate respectively.

6. The game of claim 5, wherein said plurality of gate sections each include a top surface that becomes substantially aligned with a corresponding one of said plurality of elongate members when said plurality of gate sections are moved to a closed position so that said plurality of balls can pass thereover respectively.

7. The game of claim 5, wherein said plurality of balls are formed from one of glass and steel materials.

* * * * *